United States Patent
Lee et al.

(10) Patent No.: US 9,954,668 B2
(45) Date of Patent: Apr. 24, 2018

(54) CO-EXISTENCE SYSTEM SYNCHRONIZATION ON A SHARED COMMUNICATION MEDIUM

(71) Applicant: QUALCOMM Incorporated, San Diego, CA (US)

(72) Inventors: Heechoon Lee, San Diego, CA (US); Ahmed Kamel Sadek, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 15/074,612

(22) Filed: Mar. 18, 2016

(65) Prior Publication Data
US 2016/0285614 A1  Sep. 29, 2016

Related U.S. Application Data

(60) Provisional application No. 62/136,703, filed on Mar. 23, 2015.

(51) Int. Cl.
*H04L 5/22* (2006.01)
*H04W 16/14* (2009.01)
(Continued)

(52) U.S. Cl.
CPC .............. *H04L 5/22* (2013.01); *H04W 16/14* (2013.01); *H04W 72/0446* (2013.01);
(Continued)

(58) Field of Classification Search
None
See application file for complete search history.

(56) References Cited

U.S. PATENT DOCUMENTS

| 9,037,144 B2 | 5/2015 | Zhang et al. |
| 2011/0116467 A1 | 5/2011 | Jung et al. |

(Continued)

FOREIGN PATENT DOCUMENTS

| EP | 2733874 A2 | 5/2014 |
| EP | 2782409 A1 | 9/2014 |
| JP | 2014187426 A | 10/2014 |

OTHER PUBLICATIONS

HT MMOBILE INC: "Discussion on Timing Relationship for Scell activation/deactivation," 3GPP Draft; R2-104906, 3rd Generation Partnership Project (3GPP), Mobile Competence Centre ; 650, Route Des Lucioles ; F-06921 Sophia-Antipolis Cedex ; France, vol RAN WG2, No. Madrid, Spain; Aug. 23, 2010, Aug. 17, 2010 (Aug. 17, 2010), XP050452022, [retrieved on Aug. 17, 2010].

(Continued)

*Primary Examiner* — Diane Lo
(74) *Attorney, Agent, or Firm* — Muncy, Geissler, Olds & Lowe, P.C.

(57) ABSTRACT

Techniques for managing co-existence on a shared communication medium are disclosed. An activation command or a deactivation command configuring an access terminal for activated operation or deactivated operation over a communication medium, respectively, may be exchanged in accordance with a Time Division Multiplexed (TDM) communication pattern defining active periods and inactive periods of communication over the communication medium. An acknowledgment message may be sent by, or received from, the access terminal in response to the activation command or the deactivation command. Communication may be activated or deactivated over the communication medium in accordance with the TDM communication pattern in response to the acknowledgment message indicating a positive acknowledgment of the activation command or the deactivation command, respectively, and not activated or (Continued)

deactivated over the communication medium in accordance with the TDM communication pattern in response to the acknowledgment message not indicating a positive acknowledgment of the activation or deactivation command.

19 Claims, 10 Drawing Sheets

(51) Int. Cl.
    *H04W 72/04* (2009.01)
    *H04W 16/16* (2009.01)
    *H04W 72/08* (2009.01)
    *H04W 52/04* (2009.01)
    *H04W 76/28* (2018.01)

(52) U.S. Cl.
    CPC ............ *H04W 16/16* (2013.01); *H04W 52/04* (2013.01); *H04W 72/042* (2013.01); *H04W 72/0453* (2013.01); *H04W 72/082* (2013.01); *H04W 76/28* (2018.02)

(56) References Cited

U.S. PATENT DOCUMENTS

| | | | |
|---|---|---|---|
| 2011/0294491 A1 | 12/2011 | Fong et al. | |
| 2012/0188907 A1* | 7/2012 | Dayal | H04W 72/1215 370/254 |
| 2013/0077558 A1* | 3/2013 | Ukita | H04W 16/26 370/315 |
| 2013/0208587 A1* | 8/2013 | Bala | H04W 16/14 370/230 |
| 2015/0063151 A1 | 3/2015 | Sadek et al. | |
| 2015/0078192 A1 | 3/2015 | Kim | |
| 2015/0230286 A1 | 8/2015 | Feuersaenger et al. | |
| 2015/0296560 A1 | 10/2015 | Sadek | |
| 2015/0326377 A1 | 11/2015 | Freda et al. | |

OTHER PUBLICATIONS

International Search Report and Written Opinion—PCT/US2016/023505—ISA/EPO—dated Jun. 7, 2016.

"Qualcomm Research LTE in Unlicensed Spectrum: Harmonious Coexistence with Wi-Fi", Jun. 30, 2014 (Jun. 30, 2014), XP055183824, Retrieved from the Internet: URL: https://www.qualcomm.com/media/documents/files/lte-unlicensed-coexistence-whitepaper.pdf [retrieved on Apr. 17, 2015] paragraph [83 .1]—paragraph [83. 2].

Samsung: "Views on required functionalities and design targets for LAA", 3GPP Draft; R1-143878—Required Functionalities, 3rd Generation Partnership Project (3GPP), Mobile Competence Centre; 650, Route Des Lucioles; F-06921 Sophia-Antipolis Cedex; France, vol. RAN WG1, No. Ljubljana, Slovenia; Oct. 6, 2014-Oct. 10, 2014, Sep. 27, 2014 (Sep. 27, 2014), XP050869555,Retrieved from the Internet: URL: http://www.3gpp.org/ftp/tsg_ran/WG1_RL1/TSGR1_78b/Docs/ [retrieved on Sep. 27, 2014] *chapters 1-3*.

ZTE: "Clarification of Timing Requirements for Activation and Deactivation of SCells in TDD mode," 3GPP Draft; R4-110871, 3rd Generation Partnership Project (3GPP), Mobile Competence Centre ; 650, Route Des Lucioles ; F-06921 Sophia-Antipolis Cedex ; France, vol. RAN WG4, No. Taipei, Taiwan; Feb. 21, 2011, Feb. 16, 2011 (Feb. 16, 2011), XP050500940, [retrieved on Feb. 16, 2011].

ZTE Corporation: "Discussion on SCell Activation," 3GPP Draft; R2-131642 Discussion on SCELL Activation, 3rd Generation Partnership Project (3GPP), Mobile Competence Centre ; 650, Route Des Lucioles ; F-06921 Sophia-Antipolis Cedex ; France, vol. RAN WG4, No. Fukuoka, Japan; May 20, 2013-May 24, 2013, May 10, 2013 (May 10, 2013), XP050699809, Retrieved from the Internet: URL:http://www.3gpp.org/ftp/tsg ran/WG2 RL 2/TSGR2 82/Docs/ [retrieved on May 10, 2013].

* cited by examiner

CO-EXISTENCE SYSTEM SYNCHRONIZATION ON A SHARED COMMUNICATION MEDIUM

CROSS-REFERENCE TO RELATED APPLICATIONS

The present application for patent claims the benefit of U.S. Provisional Application No. 62/136,703, entitled "Co-Existence System Synchronization in Shared Spectrum," filed Mar. 23, 2015, assigned to the assignee hereof and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, sending an activation command or a deactivation command configuring an access terminal for activated operation or deactivated operation over a communication medium, respectively, in accordance with a Time Division Multiplexed (TDM) communication pattern defining active periods and inactive periods of communication over the communication medium; receiving an acknowledgment message from the access terminal in response to the activation command or the deactivation command; and activating or deactivating communication over the communication medium in accordance with the TDM communication pattern in response to the acknowledgment message indicating a positive acknowledgment of the activation command or the deactivation command, respectively, and refraining from activating or deactivating communication over the communication medium in accordance with the TDM communication pattern in response to the acknowledgment message not indicating a positive acknowledgment of the activation command or the deactivation command.

In another example, a communication apparatus is disclosed. The apparatus may include, for example, at least one transceiver, at least one processor, and at least one memory coupled to the at least one processor. The at least one transceiver may be configured to send an activation command or a deactivation command configuring an access terminal for activated operation or deactivated operation over a communication medium, respectively, in accordance with a TDM communication pattern defining active periods and inactive periods of communication over the communication medium, and to receive an acknowledgment message from the access terminal in response to the activation command or the deactivation command. The at least one processor and the at least one memory may be configured to activate or deactivate communication over the communication medium in accordance with the TDM communication pattern in response to the acknowledgment message indicating a positive acknowledgment of the activation command or the deactivation command, respectively, and to refrain from activating or deactivating communication over the communication medium in accordance with the TDM communication pattern in response to the acknowledgment message not indicating a positive acknowledgment of the activation command or the deactivation command.

In another example, another communication apparatus is disclosed. The apparatus may include, for example, means for sending an activation command or a deactivation command configuring an access terminal for activated operation or deactivated operation over a communication medium, respectively, in accordance with a TDM communication pattern defining active periods and inactive periods of communication over the communication medium; means for receiving an acknowledgment message from the access terminal in response to the activation command or the deactivation command; and means for activating or deactivating communication over the communication medium in accordance with the TDM communication pattern in response to the acknowledgment message indicating a positive acknowledgment of the activation command or the deactivation command, respectively, and refraining from activating or deactivating communication over the communication medium in accordance with the TDM communication pattern in response to the acknowledgment message not indicating a positive acknowledgment of the activation command or the deactivation command.

In another example, a transitory or non-transitory computer-readable medium is disclosed. The computer-readable medium may include, for example, code for sending an activation command or a deactivation command configuring an access terminal for activated operation or deactivated operation over a communication medium, respectively, in accordance with a TDM communication pattern defining active periods and inactive periods of communication over the communication medium; code for receiving an acknowledgment message from the access terminal in response to the activation command or the deactivation command; and code for activating or deactivating communication over the communication medium in accordance with the TDM communication pattern in response to the acknowledgment message indicating a positive acknowledgment of the activation command or the deactivation command, respectively, and refraining from activating or deactivating communication over the communication medium in accordance with the TDM communication pattern in response to the acknowledgment message not indicating a positive acknowledgment of the activation command or the deactivation command.

In another example, another communication method is disclosed. The method may include, for example, receiving an activation command or a deactivation command configuring an access terminal for activated operation or deactivated operation over a communication medium, respectively, in accordance with a TDM communication pattern defining active periods and inactive periods of communication over the communication medium; sending an acknowledgment message to an access point in response to the activation command or the deactivation command; and activating or deactivating communication over the communication medium in accordance with the TDM communication pattern in response to the acknowledgment message indicating a positive acknowledgment of the activation command or the deactivation command, respectively, and refraining from activating or deactivating communication over the communication medium in accordance with the TDM communication pattern in response to the acknowledgment message not indicating a positive acknowledgment of the activation command or the deactivation command.

In another example, another communication apparatus is disclosed. The apparatus may include, for example, at least one transceiver, at least one processor, and at least one memory coupled to the at least one processor. The at least one transceiver may be configured to receive an activation command or a deactivation command configuring an access terminal for activated operation or deactivated operation over a communication medium, respectively, in accordance with a TDM communication pattern defining active periods and inactive periods of communication over the communication medium, and to send an acknowledgment message to an access point in response to the activation command or the deactivation command. The at least one processor and the at least one memory may be configured to activate or deactivate communication over the communication medium in accordance with the TDM communication pattern in response to the acknowledgment message indicating a positive acknowledgment of the activation command or the deactivation command, respectively, and to refrain from activating or deactivating communication over the communication medium in accordance with the TDM communication pattern in response to the acknowledgment message not indicating a positive acknowledgment of the activation command or the deactivation command.

In another example, another communication apparatus is disclosed. The apparatus may include, for example, means for receiving an activation command or a deactivation command configuring an access terminal for activated operation or deactivated operation over a communication medium, respectively, in accordance with a TDM communication pattern defining active periods and inactive periods of communication over the communication medium; means for sending an acknowledgment message to an access point in response to the activation command or the deactivation command; and means for activating or deactivating communication over the communication medium in accordance with the TDM communication pattern in response to the acknowledgment message indicating a positive acknowledgment of the activation command or the deactivation command, respectively, and refraining from activating or deactivating communication over the communication medium in accordance with the TDM communication pattern in response to the acknowledgment message not indicating a positive acknowledgment of the activation command or the deactivation command.

In another example, another transitory or non-transitory computer-readable medium is disclosed. The computer-readable medium may include, for example, code for receiving an activation command or a deactivation command configuring an access terminal for activated operation or deactivated operation over a communication medium, respectively, in accordance with a TDM communication pattern defining active periods and inactive periods of communication over the communication medium; code for sending an acknowledgment message to an access point in response to the activation command or the deactivation command; and code for activating or deactivating communication over the communication medium in accordance with the TDM communication pattern in response to the acknowledgment message indicating a positive acknowledgment of the activation command or the deactivation command, respectively, and refraining from activating or deactivating communication over the communication medium in accordance with the TDM communication pattern in response to the acknowledgment message not indicating a positive acknowledgment of the activation command or the deactivation command.

BRIEF DESCRIPTION OF THE DRAWINGS

The accompanying drawings are presented to aid in the description of various aspects of the disclosure and are provided solely for illustration of the aspects and not limitation thereof

DETAILED DESCRIPTION

The present disclosure relates generally to activation and deactivation synchronization on a shared communication medium. A Discontinuous Transmission (DTX) communication scheme may define a Time Division Multiplexing (TDM) communication pattern including a series of active and inactive periods of operation on the communication medium. In addition, as described in more detail below, access terminals may be synchronized to access point operation in this regard using activation or deactivation commands and corresponding acknowledgment messages. The acknowledgment messages may help to ensure a more robust synchronization. Further, the access terminals may be provisioned (e.g., pre-programmed, dynamically configured, etc.) with related information such as a margin period to assist in synchronization based on the timing of the activation or deactivation commands.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1A:
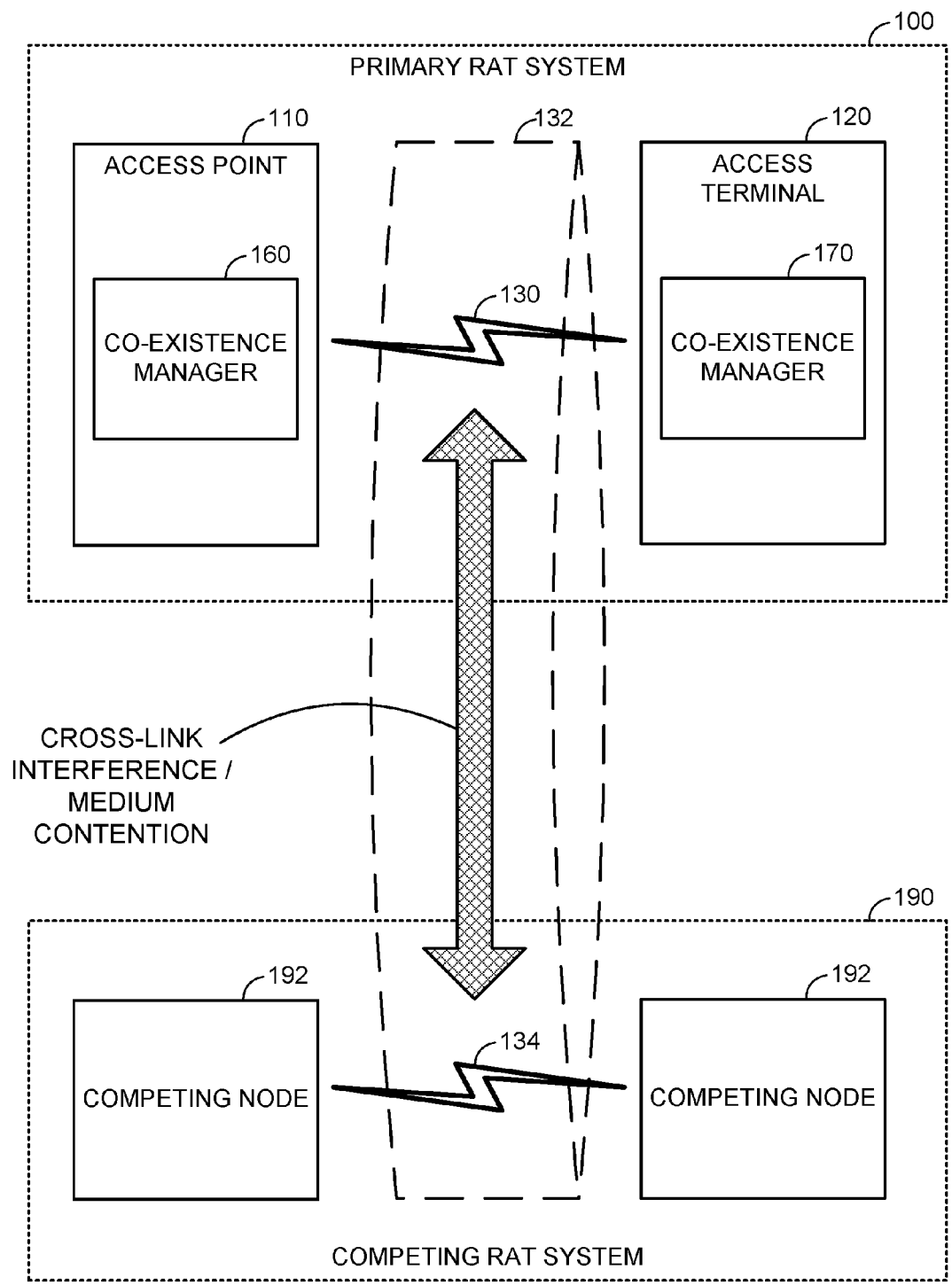
FIG. 1A is a system-level diagram illustrating an example wireless network environment.

FIG. 1A is a system-level diagram illustrating an example wireless network environment, shown by way of example as including a "primary" Radio Access Technology (RAT) system 100 and a "competing" RAT system 190. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 190 is shown as including two competing nodes 192 in communication with each other over a separate wireless link 134, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology, while the competing nodes 192 of the competing RAT system 190 may communicate via the wireless link 134 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1A, the wireless link 130 used by the primary RAT system 100 and the wireless link 134 used by the competing RAT system 190 may operate over a shared communication medium 132. A communication medium of this type may be composed of one or more frequency, time, and/or space communication resources (e.g., encompassing one or more channels across one or more carriers). As an example, the communication medium 132 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 132, there is the potential for cross-link interference between the wireless link 130 and the wireless link 134. Further, some RATs and some jurisdictions may require contention or "Listen Before Talk (LBT)" for access to the communication medium 132. As an example, the Wi-Fi IEEE 802.11 protocol family of standards provides a Carrier Sense Multiple Access/Collision Avoidance (CSMA/CA) protocol in which each Wi-Fi device verifies via medium sensing the absence of other traffic on a shared communication medium before seizing (and in some cases reserving) the communication medium for its own transmissions. As another example, the European Telecommunications Standards Institute (ETSI) mandates contention for all devices regardless of their RAT on certain communication mediums such as unlicensed frequency bands.

As will be described in more detail below, the access point 110 and/or the access terminal 120 may be variously configured in accordance with the teachings herein to provide or otherwise support the co-existence management techniques discussed briefly above. For example, the access point 110 may include a co-existence manager 160, while the access terminal 120 may include a co-existence manager 170.

Figure 1B:
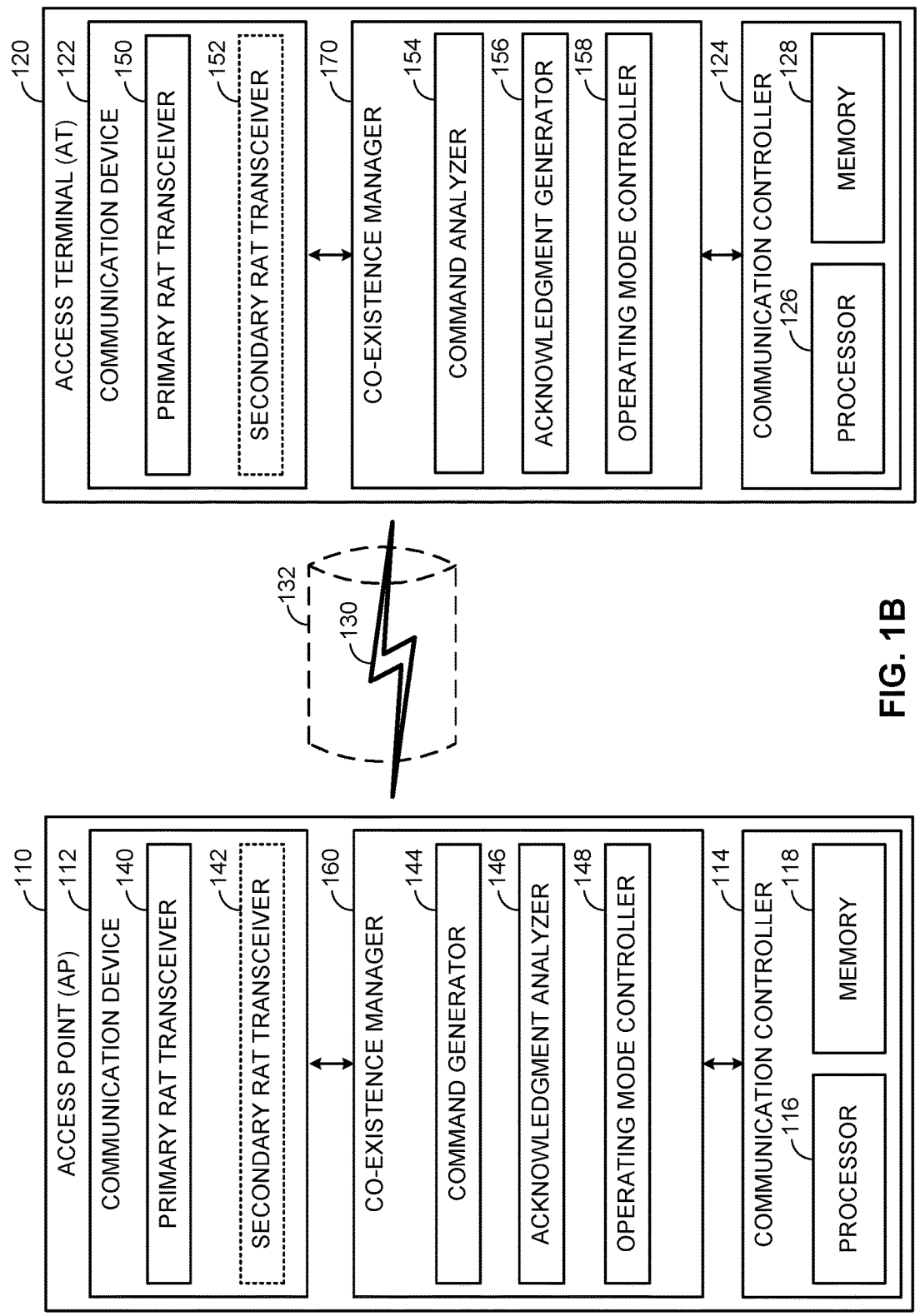
FIG. 1B is a device-level diagram illustrating example components of the access point and the access terminal of the wireless network in FIG. 1A in more detail.

FIG. 1B is a device-level diagram illustrating example components of the access point 110 and the access terminal 120 of the primary RAT system 100 in more detail. As shown, the access point 110 and the access terminal 120 may each generally include a wireless communication device (represented by communication devices 112 and 122) for communicating with other wireless nodes via at least one designated RAT. The communication devices 112 and 122 may be variously configured for transmitting and encoding signals, and, conversely, for receiving and decoding signals in accordance with the designated RAT (e.g., messages, indications, information, pilots, and so on).

The communication devices 112 and 122 may include, for example, one or more transceivers, such as respective primary RAT transceivers 140 and 150, and, in some designs, (optional) co-located secondary RAT transceivers 142 and 152, respectively (corresponding, for example, to the RAT employed by the competing RAT system 190). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by communication controllers 114 and 124) for controlling operation of their respective communication devices 112 and 122 (e.g., directing, modifying, enabling, disabling, etc.). The communication controllers 114 and 124 may include one or more processors 116 and 126, and one or more memories 118 and 128 coupled to the processors 116 and 126, respectively. The memories 118 and 128 may be configured to store data, instructions, or a combination thereof, either as on-board cache memory, as separate components, a combination, etc. The processors 116 and 126 and the memories 118 and 128 may be standalone communication components or may be part of the respective host system functionality of the access point 110 and the access terminal 120.

In the illustrated example, the co-existence manager 160 of the access point 110 includes a command generator 144, an acknowledgment analyzer 146, and an operating mode controller 148. Similarly, the co-existence manager 170 of the access terminal 120 includes a command analyzer 154, an acknowledgment generator 156, and an operating mode controller 158. It will be appreciated, however, that the co-existence manager 160 and the co-existence manager 170 may be implemented in different ways, and that some or all of the functionality associated therewith may be implemented by or otherwise at the direction of at least one processor (e.g., one or more of the processors 116 and/or one or more of the processors 126) and at least one memory (e.g., e.g., one or more of the memories 118 and/or one or more of the memories 128).

Figure 2:
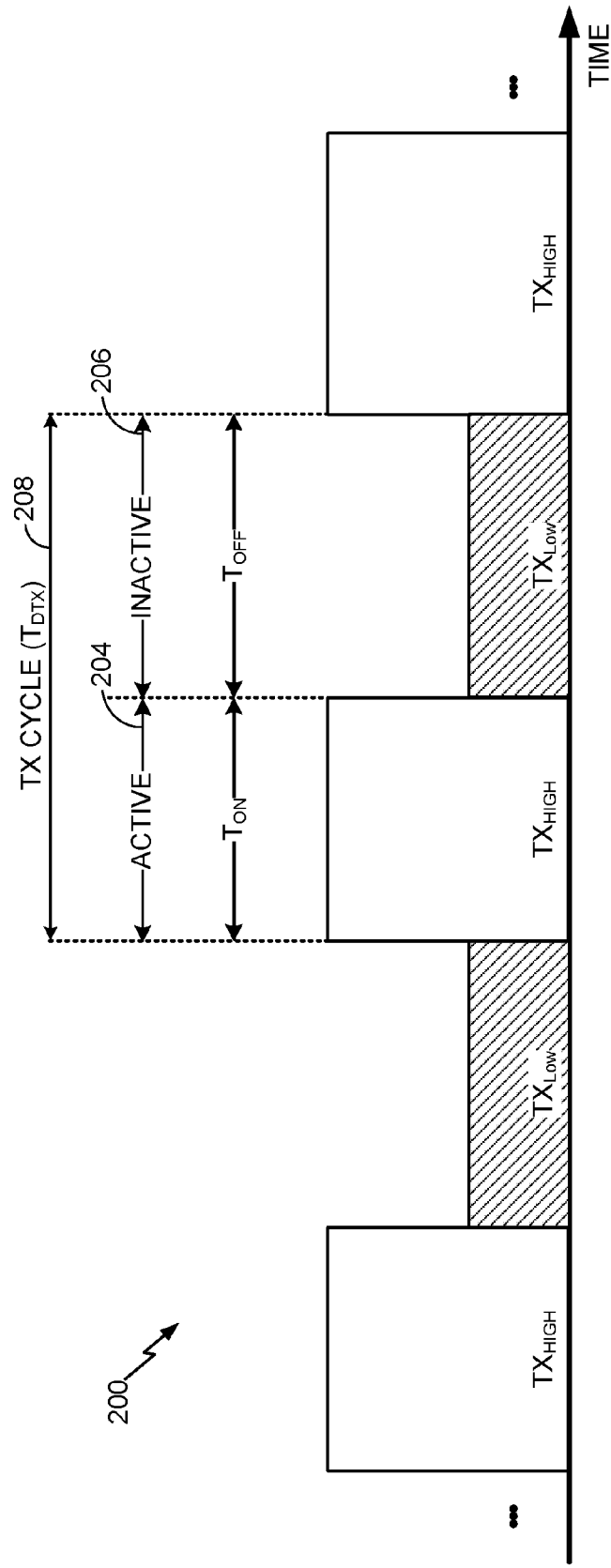
FIG. 2 illustrates certain aspects of an example Discontinuous Transmission (DTX) communication scheme.

FIG. 2 illustrates certain aspects of an example Discontinuous Transmission (DTX) communication scheme that may be implemented by the primary RAT system 100 on the communication medium 132. The DTX communication scheme may be used to foster time-division-based co-existence with the competing RAT system 190. As shown, usage of the communication medium 132 for primary RAT communication may be divided into a series of active periods 204 and inactive periods 206 of communication. The relationship between the active periods 204 and the inactive periods 206 may be adapted in different ways to promote fairness between the primary RAT system 100 and the competing RAT system 190.

A given active period 204/inactive period 206 pair may constitute a transmission (TX) cycle ($T_{DTX}$) 208 within a larger Time Division Multiplexed (TDM) communication pattern 200. During a period of time $T_{ON}$ associated with each active period 204, primary RAT communication on the communication medium 132 may proceed at a normal, relatively high transmission power ($TX_{HIGH}$). During a period of time $T_{OFF}$ associated with each inactive period 206, however, primary RAT communication on the communication medium 132 may be disabled or at least sufficiently reduced to a relatively low transmission power ($TX_{LOW}$) in order to yield the communication medium 132 to the competing RAT system 190. During this time, various network listening functions and associated measurements may be performed by the access point 110 and/or the access terminal 120, such as medium utilization measurements, medium utilization assessment sensing, and so on.

The DTX communication scheme may be characterized by a set of one or more DTX parameters. Each of the associated DTX parameters, including, for example, a period duration (e.g., the length of $T_{DTX}$), a duty cycle (e.g., $T_{ON}/T_{DTX}$), and the respective transmission powers during active periods 204 and inactive periods 206 ($TX_{HIGH}$ and $TX_{LOW}$, respectively), may be adapted based on the current signaling conditions on the communication medium 132 to dynamically optimize the fairness of the DTX communication scheme.

With reference again to FIG. 1B, the communication device 112 (e.g., via the secondary RAT transceiver 142) may be configured to monitor the communication medium 132 during the time period $T_{OFF}$ for secondary RAT signaling, such as signaling from the competing RAT system 190, which may interfere with or be interfered with by primary RAT signaling over the communication medium 132. A utilization metric may then be determined that is associated with utilization of the communication medium 132 by the secondary RAT signaling. Based on the utilization metric, one or more of the associated parameters discussed above may be set and the primary RAT transceiver 140 may be configured to cycle between the active periods 204 of communication and the inactive periods 206 of communication over the communication medium 132 in accordance therewith.

As an example, if the utilization metric is high (e.g., above a threshold), one or more of the parameters may be adjusted such that usage of the communication medium 132 by the primary RAT transceiver 140 is reduced (e.g., via a decrease in the duty cycle or transmission power). Conversely, if the utilization metric is low (e.g., below a threshold), one or more of the parameters may be adjusted such that usage of the communication medium 132 by the primary RAT transceiver 140 is increased (e.g., via an increase in the duty cycle or transmission power).

It may be advantageous to synchronize the access terminal 120 with DTX operation and the corresponding TDM communication pattern 200 by using activation/deactivation commands and corresponding acknowledgment messages. Without synchronization, the access terminal 120 may attempt to perform various measurements during the inactive periods 206 but will not be able to find the access point 110 during this time. Such measurements may include Carrier-to-Interference (C/I) measurements, Reference Signal Received Power (RSRP) measurements, Reference Signal Received Quality (RSRQ) measurements, and Channel Quality Indicator (CQI) measurements, for example, which are based on signals (e.g., a Cell-specific Reference Signal (CRS)) that the access point 110 may not be transmitting during the inactive periods 206. Corruption of these measurements may impact measurement and timing accuracy, tracking loop procedures, etc., and detrimentally affect proper operation of the system. The use of acknowledgment messages in conjunction with the activation/deactivation commands may help to better ensure the effectiveness of synchronization between the access point 110 and the access terminal 120.

Figure 3:
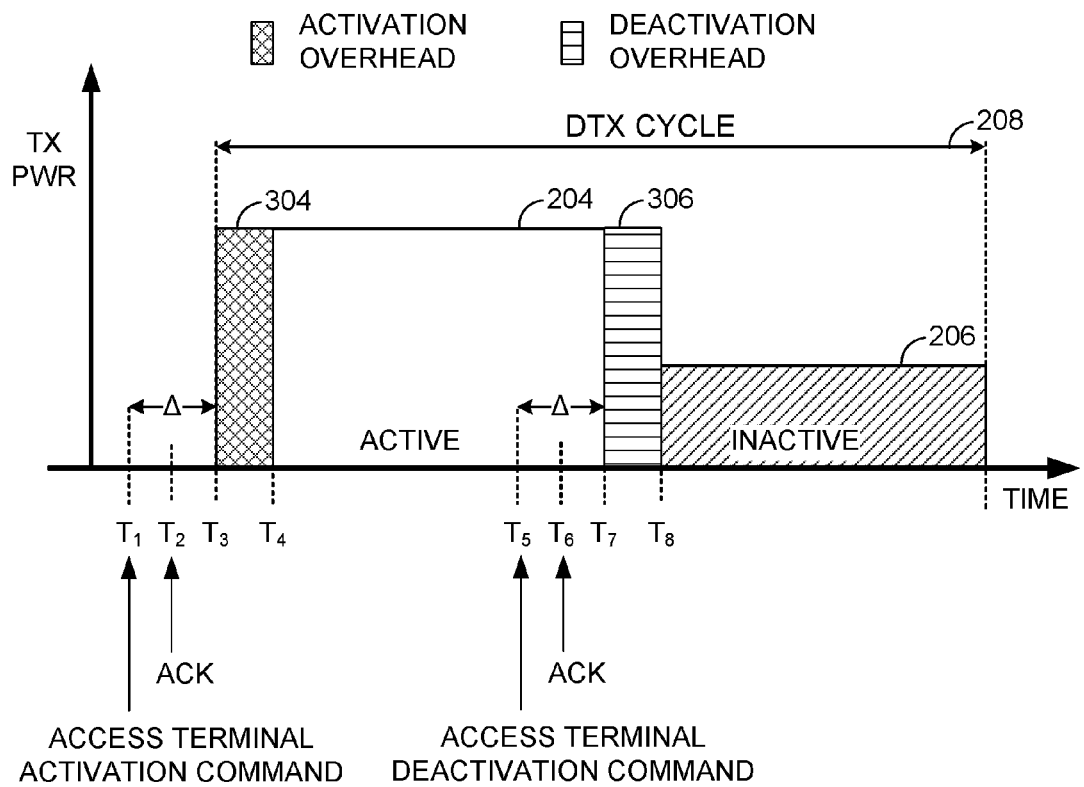
FIG. 3 is a timing diagram illustrating an example Discontinuous Transmission (DTX) communication scheme with access terminal activation/deactivation command and acknowledgment message synchronization.

FIG. 3 is a timing diagram illustrating an example of a DTX communication scheme with access terminal activation/deactivation command and acknowledgment message synchronization. In this example, the command generator 144 of the access point 110 may send (e.g., via the primary RAT transceiver 140) an activation command to the access terminal 120 at a first time $T_1$ in advance of the start of an example instance of the active period 204. The activation command may be used to configure the access terminal 120 for activated operation over the communication medium 132 in accordance with a TDM communication pattern such as the TDM communication pattern 200 or the like. Concurrently at time $T_1$, or shortly thereafter, the command analyzer 154 of the access terminal 120 may receive the activation command (e.g., via the primary RAT transceiver 150) from the access point 110.

In response to the activation command, the acknowledgment generator 156 of the access terminal 120 may send an acknowledgment (ACK) message (e.g., via the primary RAT transceiver 150) to the access point 110 at a later time $T_2$. In general, the acknowledgment message may indicate a positive acknowledgment of the activation command when the activation command is successfully received and decoded, or a negative acknowledgment of the activation command when the activation command is not successfully received or decoded. Concurrently at time $T_2$, or shortly thereafter, the acknowledgment analyzer 146 of the access point 110 may receive the acknowledgment message from the access terminal 120. In the illustrated example, the acknowledgment message exchange occurs prior to the start of the active period 204 and is successful, indicating a positive acknowledgment of the activation command.

In response to the acknowledgment message indicating a positive acknowledgment of the activation command, the operating mode controller 148 of the access point 110 may activate communication (e.g., resume transmission of normal signaling) in accordance with the TDM communication pattern 200 at the start of the active period 204 (time $T_3$). Similarly, in response to the acknowledgment message indicating a positive acknowledgment of the activation command, the operating mode controller 158 of the access terminal 120 may activate communication (e.g., expect transmission of normal signaling by activating receiver processing, activating both transmitter/receiver processing for Time Division Duplex (TDD) operation, etc.) in accordance with the TDM communication pattern 200 at the start of the active period 204 (time $T_3$).

In addition, however, the access terminal 120 may need to perform one or more ramp-up procedures to be ready for normal operation during the active period 204, which represent an activation overhead 304 between the start of the active period 204 at time $T_3$ and the conclusion of the ramp-up procedures at a later time $T_4$. The ramp-up procedures may be used to set various modem settings of the primary RAT transceiver 150 of the access terminal 120, for example, such as Automatic Gain Control (AGC), firmware, etc., which may need to be adjusted based on changes in the operating system or environment during the preceding inactive period 206. During the ramp-up time period between time $T_3$ and time $T_4$, the operating mode controller 148 of the access point 110 may be configured to restrict transmission by the access point 110 to a subset of signaling associated with facilitating the ramp-up procedures (e.g., measurement signaling such as CRS, etc.).

To accommodate the relatively short nature of the DTX cycle 208 as compared to other conventional on/off procedures (e.g., Radio Resource Control (RRC) configuring/de-configuring of an SCell), the access terminal 120 may be required to perform a "fast" ramp-up (e.g., by monitoring a Demodulation Reference Signal (DRS) in the preceding inactive period 206 and using it for channel estimation). As an example, the access terminal 120 may be expected to be ready to decode the Physical Downlink Control Channel (PDCCH) in a relatively short amount of time for the activation overhead 304 such as 2-3 ms. In some designs, the access terminal 120 may be expected to be ready in an amount of time for the activation overhead 304 that is set in accordance with a duration of the preceding inactive period 206. For example, if the duration of the preceding inactive period 206 is less than a threshold, the access terminal 120 may be expected to be ready in a shorter amount of time than when the duration of the preceding inactive period 206 is above the threshold.

Returning to FIG. 3, the command generator 144 of the access point 110 may additionally send (e.g., via the primary RAT transceiver 140) a deactivation command to the access terminal 120 at a later time $T_5$ in advance of the start of an example instance of the inactive period 206. The deactivation command may be used to configure the access terminal 120 for deactivated operation over the communication medium 132 in accordance with a TDM communication pattern such as the TDM communication pattern 200 or the like. Concurrently at time $T_5$, or shortly thereafter, the command analyzer 154 of the access terminal 120 may receive the deactivation command (e.g., via the primary RAT transceiver 150) from the access point 110.

In response to the deactivation command, the acknowledgment generator 156 of the access terminal 120 may send another acknowledgment message (e.g., via the primary RAT transceiver 150) to the access point 110 at a later time $T_6$. Again, in general, the acknowledgment message may indicate a positive acknowledgment of the deactivation command when the deactivation command is successfully received and decoded, or a negative acknowledgment of the deactivation command when the deactivation command is not successfully received or decoded. Concurrently at time $T_6$, or shortly thereafter, the acknowledgment analyzer 146 of the access point 110 may receive the acknowledgment message from the access terminal 120. In the illustrated example, the acknowledgment message exchange occurs prior to the start of the inactive period 206 and is successful, indicating a positive acknowledgment of the deactivation command.

In response to the acknowledgment message indicating a positive acknowledgment of the deactivation command, the operating mode controller 148 of the access point 110 may deactivate communication (e.g., cease transmission of normal signaling) in accordance with the TDM communication pattern 200 at the start of the inactive period 206 (time $T_7$). Similarly, in response to the acknowledgment message indicating a positive acknowledgment of the activation command, the operating mode controller 158 of the access terminal 120 may deactivate communication (e.g., not expect transmission of normal signaling, refrain from performing various measurements, etc.) in accordance with the TDM communication pattern 200 at the start of the inactive period 206 (time $T_7$).

In addition, however, the access terminal 120 may also need to perform one or more ramp-down procedures to transition away from normal operation during the inactive period 206, which represent a deactivation overhead 306 between the start of the inactive period 206 at time $T_7$ and the conclusion of the ramp-down procedures at a later time $T_8$. The ramp-down procedures may be used to set various modem settings of the primary RAT transceiver 150 of the access terminal 120, for example, correspondingly similar to the settings for the ramp-up procedures described above. During the ramp-down time period between time $T_7$ and time $T_8$, the operating mode controller 148 of the access point 110 may be configured to restrict transmission by the access point 110 to a subset of signaling associated with facilitating the ramp-down procedures (e.g., measurement signaling such as CRS, etc.). Further, to accommodate the relatively short nature of the DTX cycle 208, the access terminal 120 may be expected to be ready for deactivation in a relatively short amount of time for the deactivation overhead 306 such as 2-3 ms.

Figure 4:
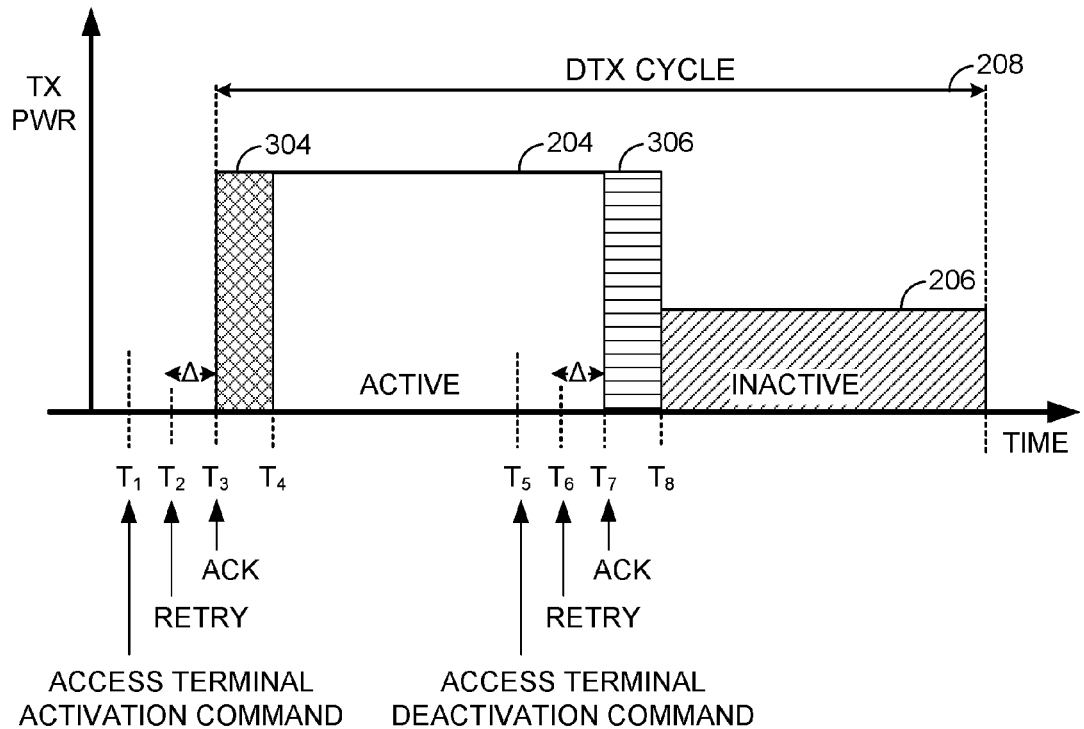
FIG. 4 is a timing diagram illustrating an example access terminal activation/deactivation command retry procedure.

FIG. 4 is a timing diagram illustrating an example access terminal activation/deactivation command retry procedure. This example is similar to that of FIG. 3, except that the acknowledgment messages for the activation and deactivation commands are initially unsuccessful, prompting a retry procedure. It will be appreciated that the acknowledgment messages for both the activation and deactivation commands being initially unsuccessful is shown for illustration purposes only, and that in other scenarios the activation command may be successful while the deactivation command is initially unsuccessful, and vice versa.

As shown, in this example, the acknowledgment analyzer 146 of the access point 110 may determine that (i) an acknowledgment message is received but indicates a negative acknowledgment or (ii) no acknowledgment message is received within a given time period (e.g., within a time period set by a corresponding timer) in response to the activation command sent at time $T_1$. In response to such a determination, the command generator 144 of the access point 110 may initiate a retry procedure and resend the activation command at a later time $T_2$. In the illustrated example, the second attempt is successful and the acknowledgment generator 156 of the access terminal 120 sends an acknowledgment message (e.g., via the primary RAT transceiver 150) to the access point 110 at a later time prior to the start of the active period 204 (time $T_3$) that indicates a positive acknowledgment of the activation command. It will be appreciated, however, that additional resend attempts may be part of the retry procedure as necessary or desired. Further, although shown as effectively simultaneous for illustration purposes, it will be appreciated that additional processing time may be required from the receipt of the acknowledgment message to the start of the active period 204.

Similarly, the acknowledgment analyzer 146 of the access point 110 may also determine that (i) an acknowledgment message is received but indicates a negative acknowledgment or (ii) no acknowledgment message is received within a given time period (e.g., within a time period set by a corresponding timer) in response to the deactivation command sent at time $T_5$. In response to such a determination, the command generator 144 of the access point 110 may initiate a retry procedure and resend the deactivation command at a later time $T_6$. In the illustrated example, the second attempt is successful and the acknowledgment generator 156 of the access terminal 120 sends an acknowledgment message (e.g., via the primary RAT transceiver 150) to the access point 110 at a later time prior to the start of the inactive period 206 (time $T_7$) that indicates a positive acknowledgment of the deactivation command. It will be appreciated, however, that additional resend attempts may be part of the retry procedure as necessary or desired. Further, although shown as effectively simultaneous for illustration purposes, it will be appreciated that additional processing time may be required from the receipt of the acknowledgment message to the start of the active period 204.

Figure 5:
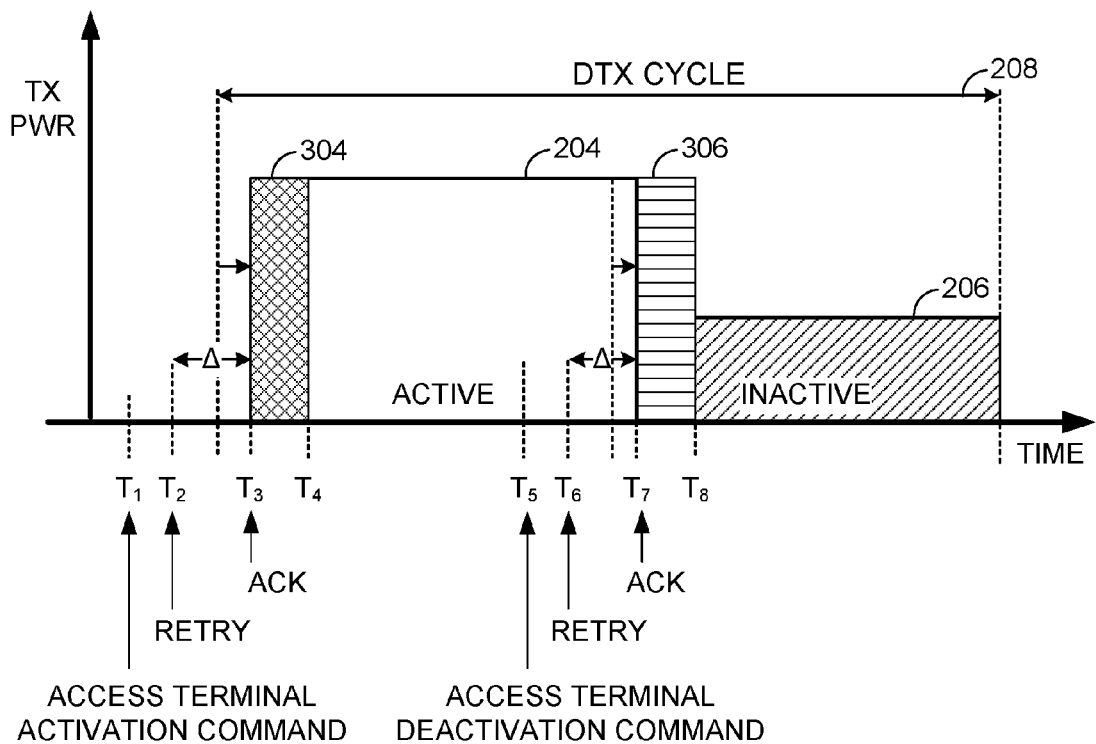
FIG. 5 is a timing diagram illustrating another example access terminal activation/deactivation command retry procedure.

FIG. 5 is a timing diagram illustrating another example access terminal activation/deactivation command retry procedure. This example is similar to that of FIG. 3, except that the acknowledgment messages for the activation and deactivation commands are initially unsuccessful, prompting a retry procedure. Further, this example is similar to that of FIG. 4, except that the retry procedure does not prompt a successful acknowledgment message for the activation or deactivation commands until after the start of the respective active period 204 or inactive period 206. Again, it will be appreciated that the acknowledgment messages for both the activation and deactivation commands being initially unsuccessful is shown for illustration purposes only, and that in other scenarios the activation command may be successful while the deactivation command is initially unsuccessful, and vice versa.

As shown, in this example, the acknowledgment analyzer 146 of the access point 110 may again determine that (i) an acknowledgment message is received but indicates a negative acknowledgment or (ii) no acknowledgment message is received within a given time period (e.g., within a time period set by a corresponding timer) in response to the activation command sent at time $T_1$. In response to such a determination, the command generator 144 of the access point 110 may again initiate a retry procedure and resend the activation command at a later time $T_2$. In the illustrated example, however, the acknowledgment generator 156 of the access terminal 120 does not send an acknowledgment message to the access point 110 that indicates a positive acknowledgment of the activation command until a later time after the start of the active period 204 (time $T_3$). This may be due to a processing delay at the access terminal 120, the need for a still further resend of the activation command (not shown), or other causes for delay. In this case, the operating mode controller 148 of the access point 110 may delay the onset of the active period 204 by refraining from activating communication in accordance with the TDM communication pattern 200, at least until such time as the acknowledgment message is actually received (time $T_3$).

Similarly, the acknowledgment analyzer 146 of the access point 110 may again determine that (i) an acknowledgment message is received but indicates a negative acknowledgment or (ii) no acknowledgment message is received within a given time period (e.g., within a time period set by a corresponding timer) in response to the deactivation command sent at time $T_3$. In response to such a determination, the command generator 144 of the access point 110 may again initiate a retry procedure and resend the deactivation command at a later time $T_6$. In the illustrated example, however, the acknowledgment generator 156 of the access terminal 120 does not send an acknowledgment message to the access point 110 that indicates a positive acknowledgment of the deactivation command until a later time after the start of the inactive period 206 (time $T_7$). This may be due to a processing delay at the access terminal 120, the need for a still further resend of the deactivation command (not shown), or other causes for delay. In this case, the operating mode controller 148 of the access point 110 may delay the onset of the inactive period 206 by refraining from deactivating communication in accordance with the TDM communication pattern 200, at least until such time as the acknowledgment message is actually received (time $T_7$).

In each of FIGS. 3-5, it can be seen that the activation command is sent in advance of the start of the (anticipated) active period 204 by a margin period $\Delta$. Similarly, the deactivation command is sent in advance of the start of the (anticipated) inactive period 206 by a margin period $\Delta$. In the illustrated examples, the margin period $\Delta$ is the same for both activation and deactivation, although it may be different in other designs or scenarios. The margin period $\Delta$ may be used to ensure the robustness of the acknowledgment mechanism and provide an opportunity for retry procedures if necessary. For example, the margin period $\Delta$ may be set sufficiently long to span the sending of an activation or deactivation command, the receiving of an acknowledgment message, and at least one retry period (e.g., one retransmission of the activation or deactivation command and an opportunity for an acknowledgment message response).

In some designs, the margin period $\Delta$ may be of a predetermined (e.g., pre-programmed or otherwise conveyed) duration and serve as an indicator of when the access point 110 should expect a given active period 204 or inactive period 206 to commence. In this way, the operating mode controller 158 of the access terminal 120 may be configured to activate or deactivate communication in accordance with the TDM communication pattern 200 at a set point in relation to when the corresponding activation or deactivation command is received. Setting the margin period $\Delta$ to a predetermined duration in this way may help cut down on signaling overhead, for example, by eliminating or reducing the number of DTX parameters that need to be conveyed to the access terminal 120, while still ensuring robust synchronization.

As a particular example, the operating mode controller 148 of the access point 110 may be configured to activate or deactivate the access terminal 120 at a periodic transition boundary (e.g., a subframe boundary) between each active period 204 and inactive period 206 (at least, in response to the acknowledgment message being received on time, in advance of the transition boundary, and indicating a positive acknowledgment of the corresponding activation or deactivation command), and the margin period $\Delta$ may be set to a predetermined offset from that transition boundary. In the context of FIG. 3, for example, the start of the active period 204 (time $T_3$) may be aligned with a particular subframe number N and the start of the inactive period 206 (time $T_7$) may be aligned with another subframe number M, with the margin period $\Delta$ being set to a predetermined number of subframes (e.g., 8 subframes in an LTE system, corresponding to an 8 ms offset, with the activation command being sent at subframe N–8 (i.e., $T_1$=N–8) and the deactivation command being sent at subframe M–8 (i.e., $T_5$=M–8)).

As a specific example of an activation/deactivation command, it may be advantageous to use the predefined Activation/Deactivation Medium Access Control (MAC) Control Element (CE) commands provided in LTE for SCell activation and deactivation operations. The Activation/Deactivation MAC CE in LTE is described in 3GPP TS 36.321, entitled "Evolved Universal Terrestrial Radio Access (E-UTRA); Medium Access Control (MAC) Protocol," which is publicly available. Although new signaling protocols and associated messages may be created to notify the access terminal 120 of one or more DTX parameters (e.g., new special-purpose MAC CE messages, Master Information Block (MIB) messages, etc.), legacy devices may not support or be able to interpret these new messages. Accordingly, the use of predefined Activation/Deactivation MAC CE commands may be advantageous in several respects.

Figure 6:
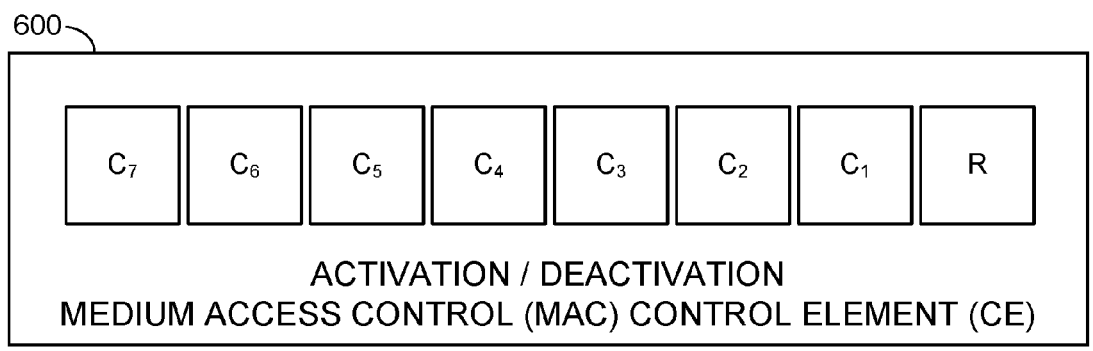
FIG. 6 illustrates an example Activation/Deactivation MAC CE that may be repurposed to activate and deactivate the access terminal in accordance with the techniques herein.

FIG. 6 illustrates an example LTE Activation/Deactivation MAC CE that may be repurposed to activate and deactivate the access terminal 120 in accordance with the techniques herein. The Activation/Deactivation MAC CE 600 is typically identified by a MAC Packet Data Unit (PDU) subheader with Logical Channel Identifier (LCID) set to '11011'. It typically has a fixed size and consists of a single octet containing seven C-fields and one R-field.

In particular, the Activation/Deactivation MAC CE 600 includes several SCellIndex fields ($C_i$: $C_1$-$C_7$) and a Reserved bit (R), as shown. Each SCellIndex field indicates the activation/deactivation status of the SCell with SCellIndex i. Each SCellIndex field may be set to '1' to indicate that the SCell with SCellIndex i is to be activated. Each SCellIndex field may be set to '0' to indicate that the SCell with SCellIndex i is to be deactivated. The Reserved bit may be set to '0'.

Figure 7:
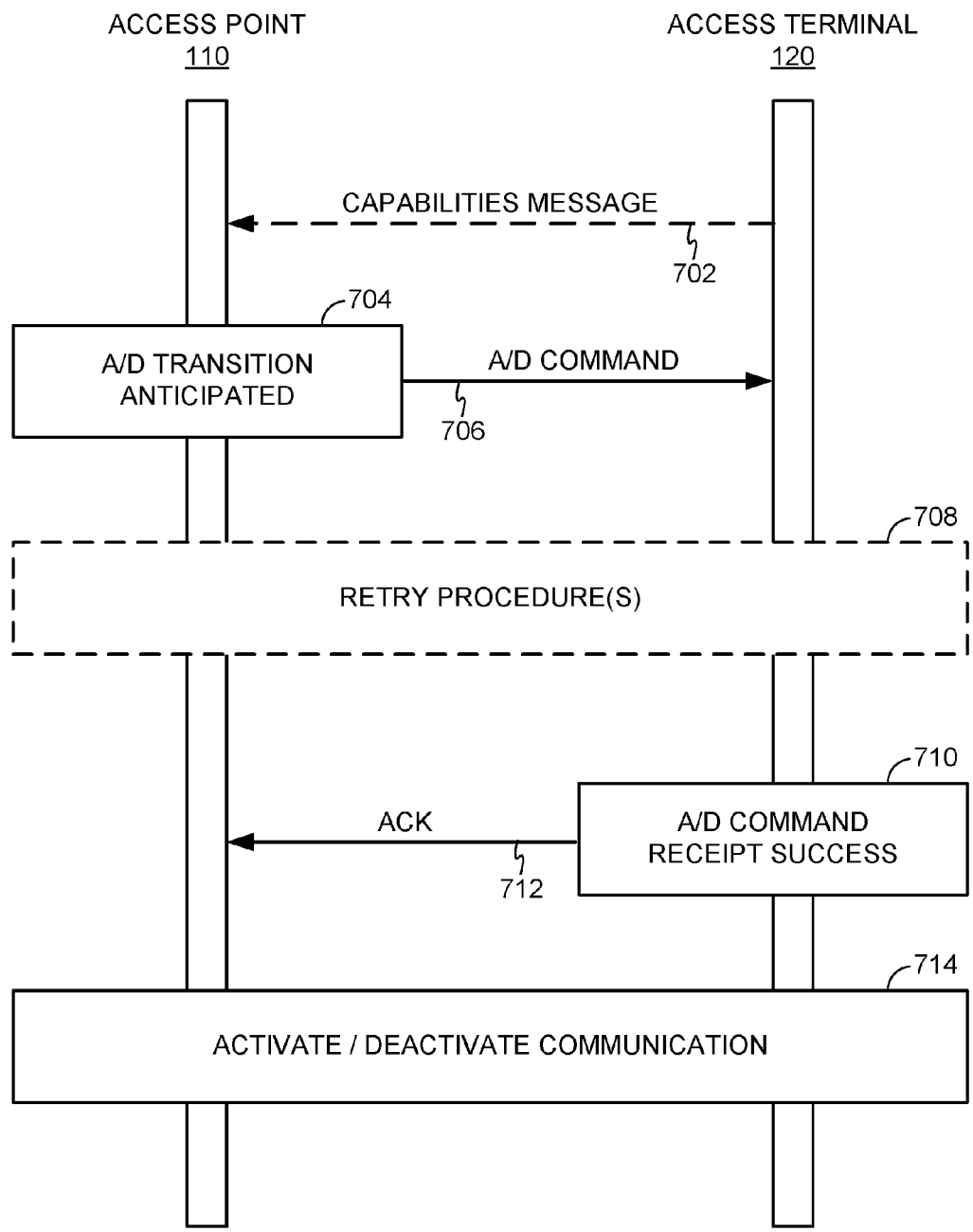
FIG. 7 is a signaling flow diagram illustrating an example access terminal activation/deactivation command and acknowledgment synchronization procedure for a DTX communication scheme.

FIG. 7 is a signaling flow diagram illustrating an example access terminal activation/deactivation command and acknowledgment synchronization procedure for a DTX communication scheme. In this example, the access point 110 synchronizes DTX operation with the access terminal 120.

In more detail, the access terminal 120 may initially send to the access point 110 (e.g., via the operating mode controller 158 in conjunction with the primary RAT transceiver 150) an optional capabilities message 702 establishing that the access terminal 120 is capable of a given activation and deactivation mode of operation (e.g., a low overhead mode of the type described above). In some designs, the capabilities message 702 may be part of a larger handshake procedure between the access terminal 120 and the access point 110 where the access point 110 configures the access terminal 120 for the appropriate mode of operation. Although implementation may vary from application to application, the optional capabilities message 702 may be used to distinguish the access terminal 120 from other, legacy devices not capable of this type of operation, which may need to be synchronized in a different manner. Where all devices are capable of this type of operation, for example, no capability message may be required.

In anticipation of an upcoming activation/deactivation ("A/D") transition (block 704), the access point 110 may send to the access terminal 120 (e.g., via the command generator 144 in conjunction with the primary RAT transceiver 140) an activation/deactivation command 706 configuring the access terminal 120 for activated operation or deactivated operation over the communication medium 132. For example, in anticipation of the start of the active period 204 at time $T_3$ or the start of the inactive period 206 at time $T_7$ in FIG. 3, the access point 110 may send the activation/deactivation command 706 at time $T_1$ or $T_5$, respectively. Depending on the success or failure of the activation/deactivation command 706, one or more retry procedures may be performed as needed or desired (optional block 708).

In response to a successful receipt at the access terminal 120 (e.g., via the command analyzer 154 in conjunction with the primary RAT transceiver 150) of the activation/deactivation command 706 (or a retransmission thereof, not shown) (block 710), the access terminal 120 may send to the access point 110 (e.g., via the acknowledgment generator 156 in conjunction with the primary RAT transceiver 150) an acknowledgment message 712 indicating a positive acknowledgment of the activation/deactivation command 706. For example, returning to the example above of the active period 204 and the inactive period 206 in FIG. 3, the access terminal 120 may send the acknowledgment message 712 at time $T_2$ or $T_6$, respectively. It will be appreciated, however, that the timing of the acknowledgment message 712 may be variously impacted by processing delays, retry procedures, etc., as described in more detail above with reference to FIGS. 4-5.

In response to the acknowledgment message 712 indicating a positive acknowledgment of the activation/deactivation command 706, both the access point 110 (e.g., via the operating mode controller 148) and the access terminal 120 (e.g., via the operating mode controller 158) may activate or deactivate communication over the communication medium 132 as appropriate (block 714). For example, again returning to the example above of the active period 204 or the inactive period 206 in FIG. 3, the access point 110 and the access terminal 120 may activate or deactivate communication over the communication medium 132 at the start of the active period 204 at time $T_3$ or at the start of the inactive period 206 at time $T_7$. Again, it will be appreciated, however, that the timing of the activating or deactivating (block 714) may be variously impacted by processing delays, retry procedures, etc., as described in more detail above with reference to FIGS. 4-5.

Figure 8:
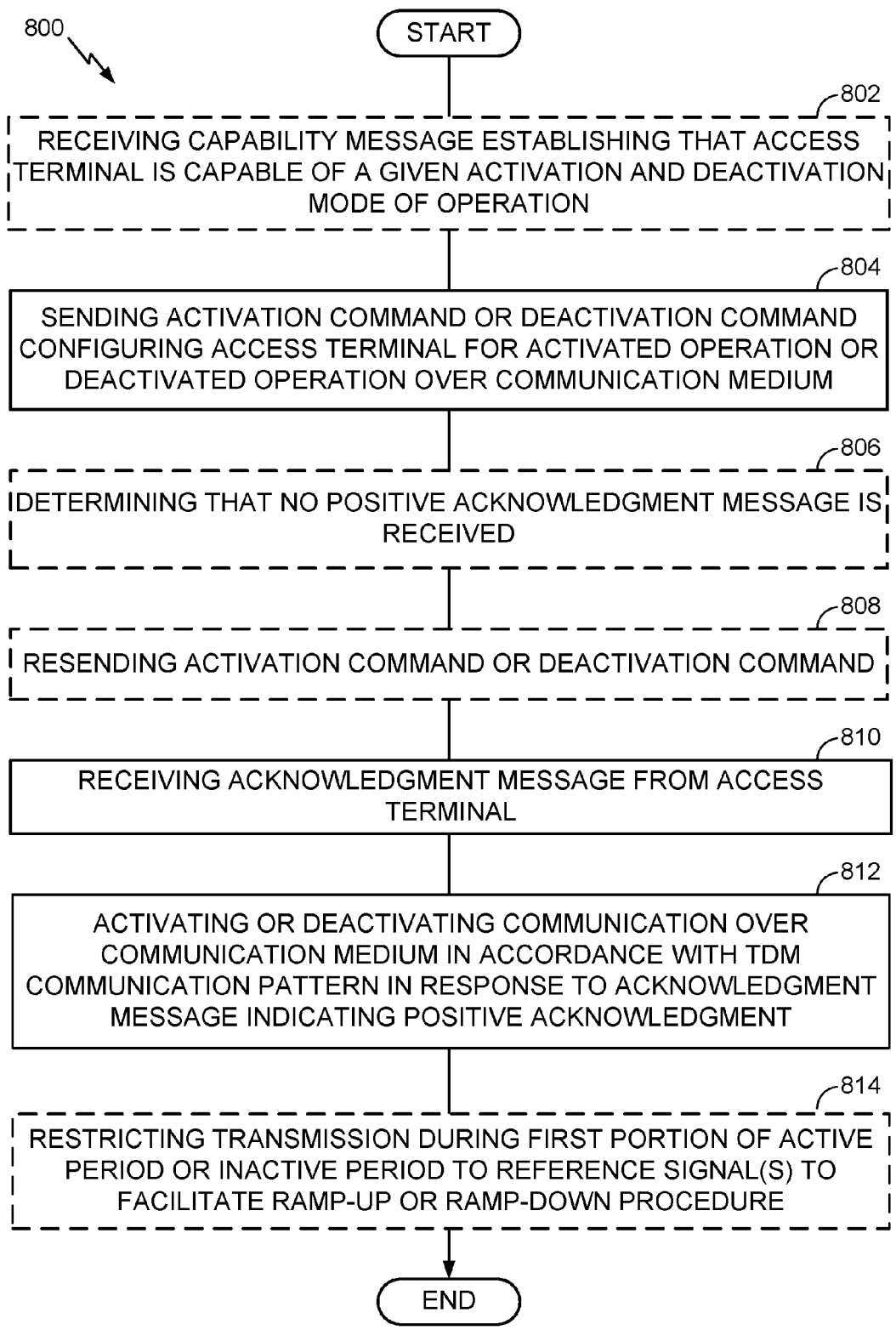
FIG. 8 is a flow diagram illustrating an example method of communication in accordance with the techniques described herein.

FIG. 8 is a flow diagram illustrating an example method of communication in accordance with the techniques described above. The method 800 may be performed, for example, by an access point (e.g., the access point 110 illustrated in FIGS. 1A-1B) operating on a shared communication medium. As an example, the communication medium may include one or more time, frequency, or space resources on an unlicensed radio frequency band shared between LTE technology and Wi-Fi technology devices.

As shown, the access point may send (block 804) an activation command or a deactivation command (e.g., a MAC CE) configuring an access terminal for activated operation or deactivated operation over the communication medium, respectively, in accordance with a TDM communication pattern (e.g., a DTX communication scheme) defining active periods and inactive periods of communication over the communication medium. The sending may be performed, for example, by a transceiver such as the primary RAT transceiver 140 or the like. The access point may receive (block 810) an acknowledgment message from the access terminal in response to the activation command or the deactivation command. The receiving may be performed, for example, by a transceiver such as the primary RAT transceiver 140 or the like. The access point may then activate or deactivate (block 812) communication over the communication medium in accordance with the TDM communication pattern in response to the acknowledgment message indicating a positive acknowledgment of the activation command or the deactivation command, respectively, and refrain from activating or deactivating communication over the communication medium in accordance with the TDM communication pattern in response to the acknowledgment message not indicating a positive acknowledgment of the activation command or the deactivation command (e.g., if the acknowledgment message indicates a negative acknowledgment, fails to properly decode, etc.). The activating or deactivation may be performed, for example, by a processor and memory such as the one or more processors 116 and the one or more memories 118 or the like.

As discussed in more detail above, the activation command or the deactivation command may be sent in advance of a corresponding active period or inactive period of the TDM communication pattern by a margin period. As an example, the margin period may be sufficiently long to span the sending of the activation command or the deactivation command, the receiving of the acknowledgment message, and at least one retry period for the sending and the receiving. The margin period may also be of a predetermined duration that identifies to the access terminal an expected offset between the activation command or the deactivation command and the corresponding active period or inactive period.

In some instances, the access point may determine (optional block 806) that (i) the acknowledgment message indicates a negative acknowledgment of the activation command or the deactivation command or (ii) the acknowledgment message is not received within a given time period (e.g., based on a timer), and resend (optional block 808) the activation command or the deactivation command in response to the determination. The determining may be performed, for example, by a processor and memory such as the one or more processors 116 and the one or more memories 118 or the like. The resending may be performed, for example, by a transceiver such as the primary RAT transceiver 140 or the like.

In some cases, the access point may activate or deactivate communication at a periodic transition boundary (e.g., subframe boundary) between an active period and an inactive period of the TDM communication pattern in response to the acknowledgment message being received in advance of the transition boundary and indicating a positive acknowledgment of the activation command or the deactivation command. Alternatively, the access point may activate or deactivate communication after the periodic transition boundary in response to the acknowledgment message being received after the transition boundary and indicating a positive acknowledgment of the activation command or the deactivation command.

In some cases, the access point may restrict (optional block 814) transmission on the communication medium during a first predetermined portion of an active period or an inactive period of the TDM communication pattern to one or more reference signals (e.g., CRS) to facilitate a ramp-up or ramp-down procedure of the access terminal. The restricting may be performed, for example, by a processor and memory such as the one or more processors 116 and the one or more memories 118 or the like.

In some designs, the access point may also receive (optional block 802) a capability message establishing that the access terminal is capable of a given (e.g., low overhead) activation and deactivation mode of operation. The receiving may be performed, for example, by a transceiver such as the primary RAT transceiver 140 or the like.

Figure 9:
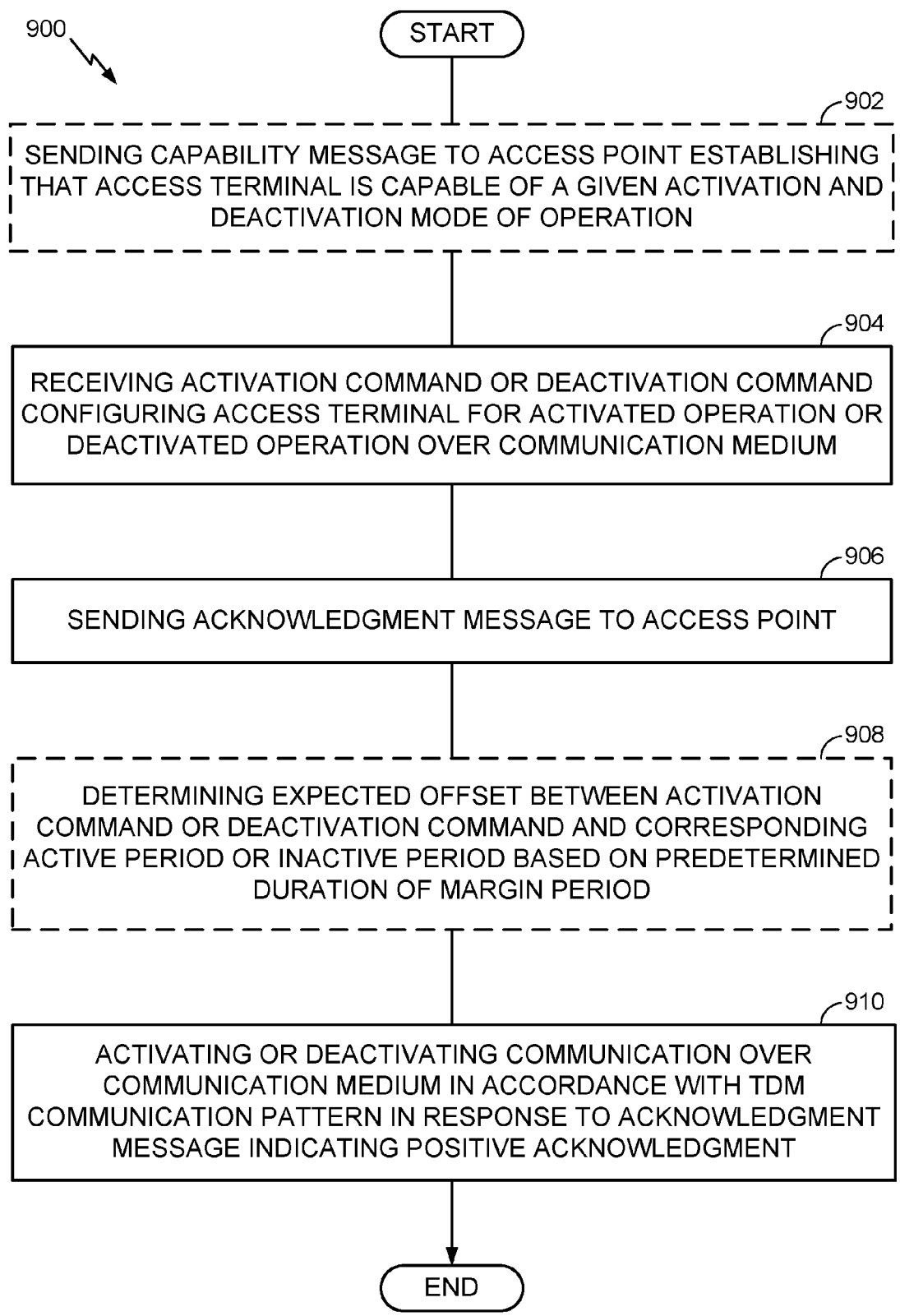
FIG. 9 is a flow diagram illustrating another example method of communication in accordance with the techniques described herein.

FIG. 9 is another flow diagram illustrating an example method of communication in accordance with the techniques described above. The method 900 may be performed, for example, by an access terminal (e.g., the access terminal 120 illustrated in FIGS. 1A-1B) operating on a shared communication medium. As an example, the communication medium may include one or more time, frequency, or space resources on an unlicensed radio frequency band shared between LTE technology and Wi-Fi technology devices.

As shown, the access terminal may receive (block 904) an activation command or a deactivation command (e.g., a MAC CE) configuring the access terminal for activated operation or deactivated operation over the communication medium, respectively, in accordance with a TDM communication pattern (e.g., a DTX communication scheme) defining active periods and inactive periods of communication over the communication medium. The receiving may be performed, for example, by a transceiver such as the primary RAT transceiver 150 or the like. The access terminal may send (block 906) an acknowledgment message to an access point in response to the activation command or the deactivation command. The sending may be performed, for example, by a transceiver such as the primary RAT transceiver 150 or the like. The access terminal may then activate or deactivate (block 910) communication over the communication medium in accordance with the TDM communication pattern in response to the acknowledgment message indicating a positive acknowledgment of the activation command or the deactivation command, respectively, and refrain from activating or deactivating communication over the communication medium in accordance with the TDM communication pattern in response to the acknowledgment message not indicating a positive acknowledgment of the activation command or the deactivation command. The activating or deactivating may be performed, for example, by a processor and memory such as the one or more processors 126 and the one or more memories 128 or the like.

As discussed in more detail above, the activation command or the deactivation command may be sent in advance of a corresponding active period or inactive period of the TDM communication pattern by a margin period. As an example, the margin period may be sufficiently long to span the sending of the activation command or the deactivation command, the receiving of the acknowledgment message, and at least one retry period for the sending and the receiving. The margin period may also be of a predetermined duration associated with an expected offset between the activation command or the deactivation command and the corresponding active period or inactive period. In this way, the access terminal may also determine (optional block 908) the expected offset between the activation command or the deactivation command and the corresponding active period or inactive period based on the predetermined duration of the margin period. The determining may be performed, for example, by a processor and memory such as the one or more processors 126 and the one or more memories 128 or the like.

In some cases, the access terminal may activate or deactivate communication at a periodic transition boundary (e.g., subframe boundary) between an active period and an inactive period of the TDM communication pattern in response to the acknowledgment message being sent in advance of the transition boundary and indicating a positive acknowledgment of the activation command or the deactivation command. Alternatively, the access terminal may activate or deactivate communication after the periodic transition boundary in response to the acknowledgment message being sent after the transition boundary and indicating a positive acknowledgment of the activation command or the deactivation command.

In some designs, the access terminal may also send (optional block 902) a capability message to the access point establishing that the access terminal is capable of a given (e.g., low overhead) activation and deactivation mode of operation. The sending may be performed, for example, by a transceiver such as the primary RAT transceiver 150 or the like.

As an example of active and inactive period characteristics, each active period of the TDM pattern may correspond to a period in which at least a CRS is enabled for transmission on the communication medium and each inactive period of the TDM pattern corresponds to a period in which at least the CRS is disabled for transmission on the communication medium.

For convenience, the access point 110 and the access terminal 120 are shown in FIGS. 1A-1B as including various components that may be configured according to the various examples described herein. It will be appreciated, however, that the illustrated blocks may be implemented in various ways. In some implementations, the components of FIGS. 1A-1B may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 10:
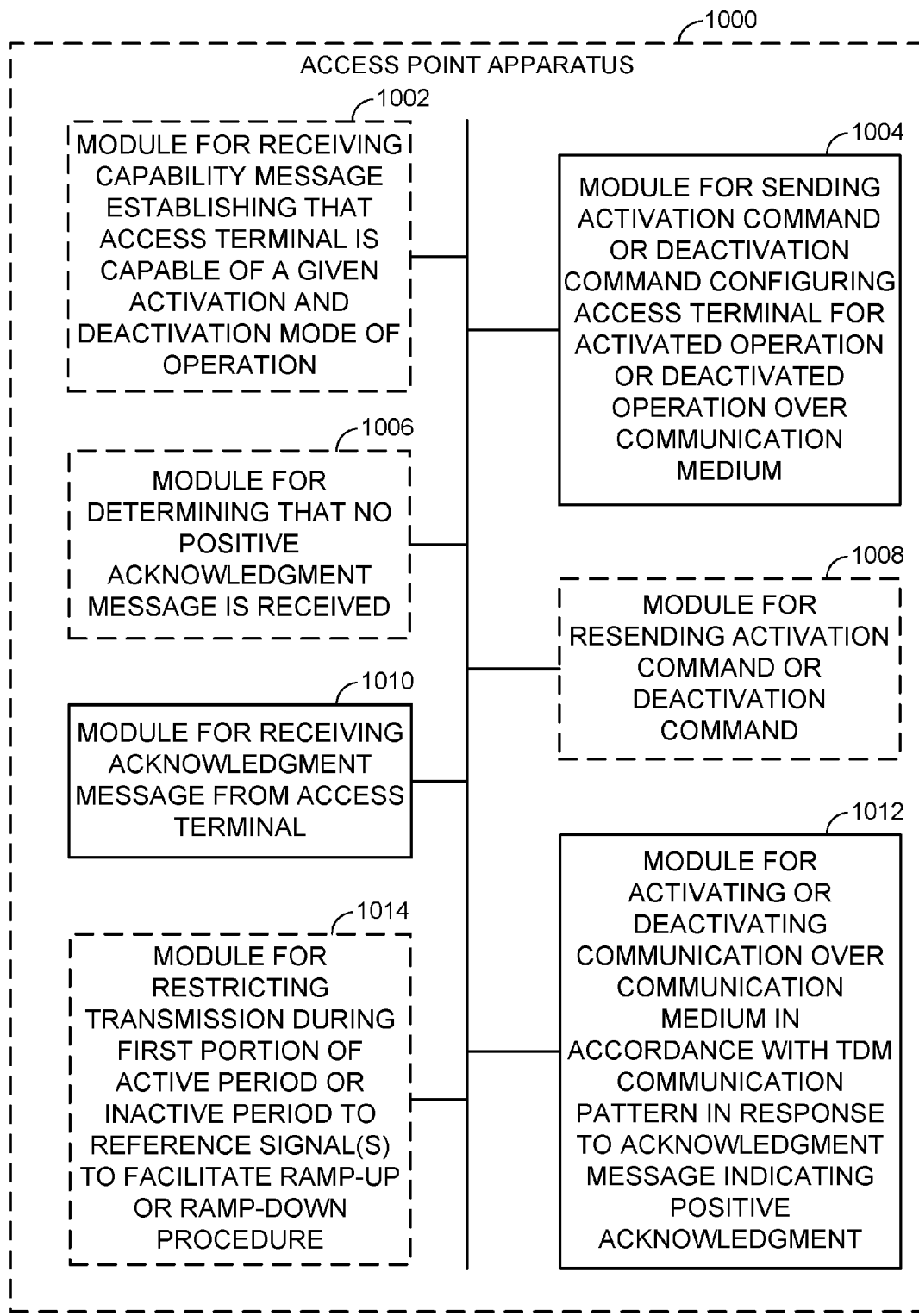
FIG. 10 illustrates an example apparatus represented as a series of interrelated functional modules.
Figure 11:
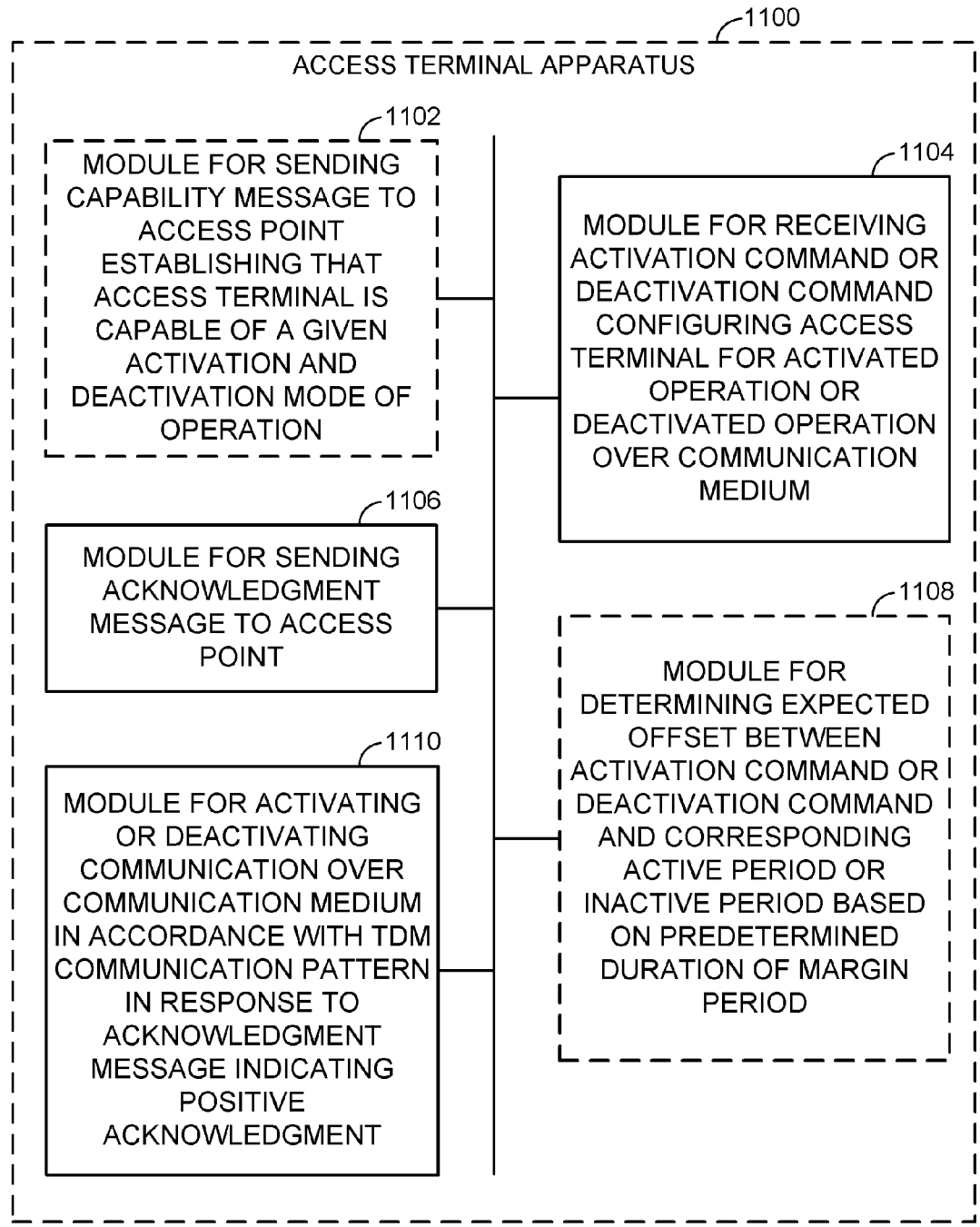
FIG. 11 illustrates another example apparatus represented as a series of interrelated functional modules.

FIGS. 10-11 provide alternative illustrations of apparatuses for implementing the access point 110 and/or the access terminal 120 represented as a series of interrelated functional modules.

FIG. 10 illustrates an example access point apparatus 1000 represented as a series of interrelated functional modules. An optional module for receiving 1002 may correspond at least in some aspects to, for example, a communication device or a component thereof as discussed herein (e.g., the communication device 112 or the like). A module for sending 1004 may correspond at least in some aspects to, for example, a communication device or a component thereof as discussed herein (e.g., the communication device 112 or the like). An optional module for determining 1006 may correspond at least in some aspects to, for example, a communication controller or a component thereof as discussed herein (e.g., the communication controller 114 or the like). An optional module for resending 1008 may correspond at least in some aspects to, for example, a communication device or a component thereof as discussed herein (e.g., the communication device 112 or the like). A module for receiving 1010 may correspond at least in some aspects to, for example, a communication device or a component thereof as discussed herein (e.g., the communication device 112 or the like). A module for activating or deactivating 1012 may correspond at least in some aspects to, for example, a communication controller or a component thereof as discussed herein (e.g., the communication controller 114 or the like). An optional module for restricting transmission 1014 may correspond at least in some aspects to, for example, a communication controller or a component thereof as discussed herein (e.g., the communication controller 114 or the like).

FIG. 11 illustrates an example access terminal apparatus 1100 represented as a series of interrelated functional modules. An optional module for sending 1102 may correspond at least in some aspects to, for example, a communication device or a component thereof as discussed herein (e.g., the communication device 122 or the like). A module for receiving 1104 may correspond at least in some aspects to, for example, a communication device or a component thereof as discussed herein (e.g., the communication device 122 or the like). A module for sending 1106 may correspond at least in some aspects to, for example, a communication device or a component thereof as discussed herein (e.g., the communication device 122 or the like). An optional module for determining 1108 may correspond at least in some aspects to, for example, a communication controller or a component thereof as discussed herein (e.g., the communication controller 124 or the like). A module for activating or deactivating 1110 may correspond at least in some aspects to, for example, a communication controller or a component thereof as discussed herein (e.g., the communication controller 124 or the like).

The functionality of the modules of FIGS. 10-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10-11, as well as other components and functions described herein, may be implemented using any suitable means. Such means also may be implemented, at least in part, using corresponding structure as taught herein. For example, the components described above in conjunction with the "module for" components of FIGS. 10-11 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
   sending an activation command or a deactivation command configuring an access terminal for activated operation or deactivated operation over a communication medium, respectively, in accordance with a Time Division Multiplexed (TDM) communication pattern defining active periods and inactive periods of communication over the communication medium;
   detecting that an acknowledgment message from the access terminal in response to the activation command or the deactivation command is not received; and
   refraining from activating or deactivating communication over the communication medium in accordance with the TDM communication pattern in response to the detecting.

2. The method of claim 1, wherein the activation command or the deactivation command is sent in advance of a corresponding active period or inactive period of the TDM communication pattern, respectively, by a margin period.

3. The method of claim 2, wherein the margin period is sufficiently long to span the sending of the activation command or the deactivation command, receiving of the acknowledgment message, and at least one retry period for the sending and the receiving.

4. The method of claim 2, wherein the margin period is of a predetermined duration that identifies to the access terminal an expected offset between the activation command or the deactivation command and the corresponding active period or inactive period, respectively.

5. The method of claim 1, wherein the communication is activated or deactivated after a periodic transition boundary between an active period and an inactive period of the TDM communication pattern in response to the acknowledgment message being received after the periodic transition boundary and indicating a positive acknowledgment of the activation command or the deactivation command.

6. The method of claim 1, further comprising restricting transmission on the communication medium during a first predetermined portion of an active period or an inactive period of the TDM communication pattern to one or more reference signals to facilitate a ramp-up or ramp-down procedure of the access terminal.

7. The method of claim 1, further comprising receiving a capability message establishing that the access terminal is capable of a given activation and deactivation mode of operation.

8. The method of claim 1, wherein the activation command or the deactivation command comprises a Medium Access Control (MAC) Control Element (CE).

9. The method of claim 1, wherein the communication medium comprises one or more time, frequency, or space resources on an unlicensed radio frequency band shared between Long Term Evolution (LTE) technology and Wi-Fi technology devices.

10. A communication apparatus, comprising:
    at least one transceiver configured to send an activation command or a deactivation command configuring an access terminal for activated operation or deactivated operation over a communication medium, respectively, in accordance with a Time Division Multiplexed (TDM) communication pattern defining active periods and inactive periods of communication over the communication medium, and to detect that an acknowledgment message from the access terminal in response to the activation command or the deactivation command is not received;
    at least one processor; and
    at least one memory coupled to the at least one processor, the at least one processor and the at least one memory being configured to refrain from activating or deactivating communication over the communication medium in accordance with the TDM communication pattern in response to the detection.

11. A communication method, comprising:
    receiving an activation command or a deactivation command configuring an access terminal for activated operation or deactivated operation over a communication medium, respectively, in accordance with a Time Division Multiplexed (TDM) communication pattern defining active periods and inactive periods of communication over the communication medium, wherein an acknowledgment message to the activation command or the deactivation command is not exchanged between the access terminal and an access point; and
    refraining from activating or deactivating communication over the communication medium in accordance with the TDM communication pattern in response to the acknowledgment message not being exchanged between the access terminal and the access point.

12. The method of claim 11, wherein the activation command or the deactivation command is received in advance of a corresponding active period or inactive period of the TDM communication pattern, respectively, by a margin period.

13. The method of claim 12, wherein the margin period is sufficiently long to span the receiving of the activation command or the deactivation command, sending of the acknowledgment message, and at least one retry period for the sending and the receiving.

14. The method of claim 12, wherein the margin period is of a predetermined duration associated with an expected offset between the activation command or the deactivation command and the corresponding active period or inactive period, respectively.

15. The method of claim 14, further comprising determining the expected offset between the activation command or the deactivation command and the corresponding active period or inactive period, respectively, based on the predetermined duration of the margin period.

16. The method of claim 11, wherein the communication is activated or deactivated after a periodic transition boundary between an active period and an inactive period of the TDM communication pattern in response to the acknowledgment message being sent after the periodic transition boundary and indicating a positive acknowledgment of the activation command or the deactivation command.

17. The method of claim 11, further comprising sending a capability message to the access point establishing that the access terminal is capable of a given activation and deactivation mode of operation.

18. The method of claim 11, wherein the activation command or the deactivation command comprises a Medium Access Control (MAC) Control Element (CE).

19. The method of claim 11, wherein each active period of the TDM communication pattern corresponds to a period in which at least a Cell-specific Reference Signal (CRS) is enabled for transmission on the communication medium and each inactive period of the TDM communication pattern corresponds to a period in which at least the CRS is disabled for transmission on the communication medium.

* * * * *